US012800923B2

(12) United States Patent
Zhang et al.

(10) Patent No.: US 12,800,923 B2
(45) Date of Patent: Nov. 17, 2026

(54) METHOD FOR CALIBRATING SCREEN OF EXTENDED REALITY DEVICE, SCREEN CALIBRATION DEVICE, ELECTRONIC DEVICE, AND COMPUTER READABLE STORAGE MEDIUM

(71) Applicant: RayNeo Co., Ltd., Shenzhen (CN)

(72) Inventors: Chi Zhang, Shenzhen (CN); Meixiang Quan, Shenzhen (CN); Yijia He, Shenzhen (CN); Ye Wang, Shenzhen (CN)

(73) Assignee: RayNeo Co., Ltd., Shenzhen (CN)

( * ) Notice: Subject to any disclaimer, the term of this patent is extended or adjusted under 35 U.S.C. 154(b) by 0 days.

(21) Appl. No.: 19/268,810

(22) Filed: Jul. 14, 2025

(65) Prior Publication Data

US 2025/0341718 A1 Nov. 6, 2025

(30) Foreign Application Priority Data

Oct. 21, 2024 (CN) ......................... 202411467952.4

(51) Int. Cl.

*G02B 27/01* (2006.01)
*G06T 7/73* (2017.01)
*G09G 3/00* (2006.01)

(52) U.S. Cl.

CPC ............ *G02B 27/0101* (2013.01); *G06T 7/73* (2017.01); *G09G 3/001* (2013.01); *G09G 2320/0693* (2013.01); *G09G 2340/0464* (2013.01)

(58) Field of Classification Search

None
See application file for complete search history.

(56) References Cited

U.S. PATENT DOCUMENTS 8,441,435 B2 * 5/2013 Kondo ............... G02B 27/0093 345/156
10,551,972 B2 * 2/2020 Moussakhani ...... G06F 3/03545
(Continued)

FOREIGN PATENT DOCUMENTS

CN 115587952 A 1/2023
CN 116309854 A * 6/2023 .............. G06T 7/80
(Continued)

OTHER PUBLICATIONS

Chinese Office Action issued in corresponding Chinese Patent Application No. 202411467952.4 dated Nov. 29, 2024, pp. 1-7.
(Continued)

*Primary Examiner* — Kenneth Bukowski
(74) *Attorney, Agent, or Firm* — PV IP PC; Wei Te Chung

(57) ABSTRACT

A screen calibration method for an extended reality device includes: collecting coordinates of corner points of a first image and a second image by the screen calibration device, where the first image is obtained by using a human-eye simulated camera to photograph a calibration target through a device screen of the extended reality device, and the second image is obtained by using the human-eye simulated camera to directly photograph the calibration target; converting the coordinates of the corner points of the first image and the coordinates of the corner points of the second image into first screen pixel coordinates and second screen pixel coordinates of the device screen according to a first corresponding relationship; and determining a refraction parameter according to the first screen pixel coordinates and the second screen pixel coordinates.

11 Claims, 7 Drawing Sheets

(56) References Cited

U.S. PATENT DOCUMENTS

| | | | | |
|---|---|---|---|---|
| 12,079,385 | B2 * | 9/2024 | Ben-Yishai | G02B 27/0093 |
| 2007/0291850 | A1 * | 12/2007 | Ishikawa | H04N 19/597 375/240.27 |
| 2024/0267505 | A1 * | 8/2024 | Yu | H04N 13/344 |
| 2025/0014153 | A1 * | 1/2025 | Li | G06T 5/80 |

FOREIGN PATENT DOCUMENTS

| | | | | | |
|---|---|---|---|---|---|
| CN | 116883507 | A | * | 10/2023 | G06T 7/80 |
| CN | 116883632 | A | | 10/2023 | |
| CN | 118429231 | A | | 8/2024 | |
| CN | 119131148 | A | * | 12/2024 | G06T 5/80 |
| CN | 121954422 | A | * | 5/2026 | |

OTHER PUBLICATIONS

Chinese Office Action issued in corresponding Chinese Patent Application No. 202411467952.4 dated Mar. 27, 2025, pp. 1-3.

* cited by examiner

Calibration target 50

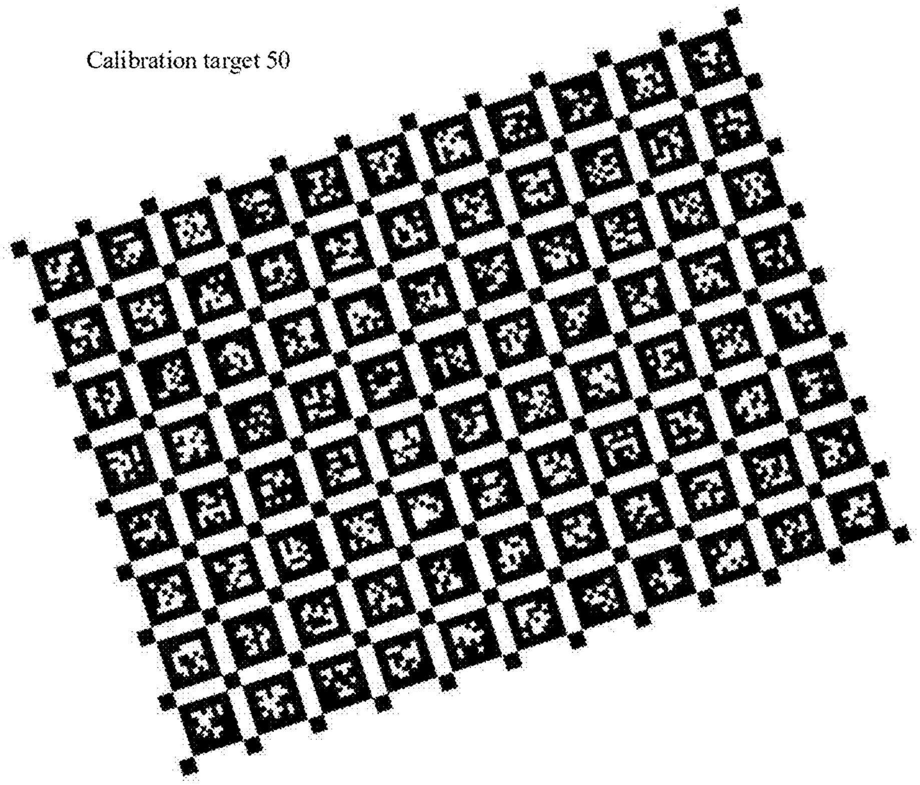

FIG. 3

S401

Collect coordinates of corner points of a first image and a second image photographed by the screen calibration device.

↓

S402

Convert the corner point coordinates of the first image and the corner point coordinates of the second image into first screen pixel coordinates and second screen pixel coordinates of the device screen of the extended reality device according to a first corresponding relationship.

↓

S403

Determine a refraction parameter of the device screen of the extended reality device according to the first screen pixel coordinates and the second screen pixel coordinates.

FIG. 4

METHOD FOR CALIBRATING SCREEN OF EXTENDED REALITY DEVICE, SCREEN CALIBRATION DEVICE, ELECTRONIC DEVICE, AND COMPUTER READABLE STORAGE MEDIUM

CROSS REFERENCE TO RELATED APPLICATION

This application is a US national phase application which claims the priority of Chinese Patent Application No. 202411467952.4, entitled "METHOD FOR CALIBRATING SCREEN OF EXTENDED REALITY DEVICE, SCREEN CALIBRATION DEVICE, ELECTRONIC DEVICE, AND COMPUTER READABLE STORAGE MEDIUM", filed on Oct. 21, 2024, the disclosure of which is incorporated herein by reference in its entirety.

FIELD OF THE INVENTION

The present disclosure relates to a field of extended reality, and more specifically, to a screen calibration method, a screen calibration device, an electronic device, and a non-transitory computer-readable storage medium for an extended reality device.

BACKGROUND

EXtended Reality (XR) technology refers to the direct display of virtual content (text, pictures, etc.) in the real field of view to create a natural, real, and fully immersive interactive experience for users through extended reality devices. One of the keys is how to achieve a completely seamless fusion of real objects in the real environment and virtual objects. The premise of virtual-real fusion is to perceive and track objects in the real environment, clarify the position of real objects relative to the extended reality device, and then overlay the rendered virtual objects on the real objects in the real environment. However, since the external light in the real environment will pass through the optical lens of the extended reality device (for ease of understanding, it can be generally referred to as the extended reality device screen) when entering the human eye, the optical lens has a refracting effect on the light, resulting in a deviation between the position of the real object observed by the human eye and the actual position of the real object. As shown in FIG. 1 illustrating a refraction of external light through the extended reality device, when the light in the external real environment passes through the optical display screen of the extended reality device (such as a wearable near-eye display system VR headset and AR glasses), the light will be offset due to refraction. Then, after the offset light enters the human eye, there will be some deviation between the world perceived by the human eye and the real world. If the rendered virtual content does not take into account the deviation caused by the influence of light refraction, and directly displays the virtual content on the real objects in the real environment obtained by perception tracking, it will lead to low accuracy of fit between the rendered content perceived by people and the real environment, and poor virtual-real fusion effect. Therefore, it is necessary to calibrate the refraction of the optical lens (i.e., the device screen of the extended reality device) to compensate for the deviation it brings.

At present, some researchers use the lens structure to model the optical path of the lens, thereby completing the calibration of the lens refraction and calculating the specific light refraction deviation. However, the optical structure of augmented reality devices is relatively complex, and the surface tolerance of optical components makes the lens curvature different, which makes it difficult to model the optical path of the lens. In addition, if the optical structure is slightly changed as the product changes, it needs to be remodeled, which means that the method of determining the light refraction deviation by modeling the lens optical path is not universal for different models of products.

SUMMARY

The embodiments of the present disclosure provide a screen calibration method, screen calibration device, electronic device, and non-transitory computer readable storage medium for an extended reality device, which can calibrate the refraction parameters of the device screen of the extended reality device.

In a first aspect, an embodiment of the present disclosure provides a screen calibration method applied in a screen calibration device of an extended reality device. The screen calibration method includes: collecting coordinates of corner points of a first image and a second image by the screen calibration device, where the first image is obtained by using a human-eye simulated camera to photograph a calibration target through a device screen of the extended reality device, and the second image is obtained by using the human-eye simulated camera to directly photograph the calibration target of the extended reality device; converting the coordinates of the corner points of the first image and the coordinates of the corner points of the second image into first screen pixel coordinates and second screen pixel coordinates of the device screen of the extended reality device according to a first corresponding relationship, wherein the first corresponding relationship is a corresponding relationship between calibrated pixels of the device screen of the extended reality device and coordinates of an image obtained by using the human-eye simulated camera to photograph the calibration target; and determining a refraction parameter of the device screen of the extended reality device according to the first screen pixel coordinates and the second screen pixel coordinates.

In an optional embodiment of the present disclosure, the determining the refraction parameter of the device screen of the extended reality device according to the first screen pixel coordinates and the second screen pixel coordinates comprises: determining a pixel offset of the device screen of the extended reality device according to differences between the first screen pixel coordinates and the second screen pixel coordinates, and determining a refraction parameter of the device screen of the extended reality device according to the pixel offset.

In an optional embodiment of the present disclosure, the determining the refraction parameter of the device screen of the extended reality device according to the first screen pixel coordinates and the second screen pixel coordinates comprises: determining a homography matrix according to the first screen pixel coordinates and the second screen pixel coordinates, and determining the refraction parameter of the device screen of the extended reality device according to the homography matrix.

In an optional embodiment of the present disclosure, the determining the refraction parameter of the device screen of the extended reality device according to the first screen pixel coordinates and the second screen pixel coordinates comprises: determining normalized coordinates of the human-eye simulated camera corresponding to the device screen of the extended reality device according to the first screen pixel coordinates and the second screen pixel coordinates, modeling the normalized coordinates of the human-eye simulated camera to optimize distortion parameters, and determining the refraction parameters of the device screen of the extended reality device according to the optimized distortion parameters.

In an optional embodiment of the present disclosure, the determining the homography matrix according to the first screen pixel coordinates and the second screen pixel coordinates comprises: determining a first matrix according to the first screen pixel coordinates and the second screen pixel coordinates, performing singular value decomposition on row vectors of the first matrix to obtain a solution corresponding to a minimum singular value, and normalizing the solution corresponding to the minimum singular value to obtain the homography matrix.

In an optional embodiment of the present disclosure, the determining normalized coordinates of the human-eye simulated camera corresponding to the device screen of the extended reality device according to the first screen pixel coordinates and the second screen pixel coordinates comprises: determining the normalized coordinates of the human-eye simulated camera corresponding to the device screen of the extended reality device according to the first screen pixel coordinates, the second screen pixel coordinates, and tooling-based intrinsic parameters of the virtual camera corresponding to the device screen of the extended reality device.

In an optional embodiment of the present disclosure, the method further comprises: determining normalized coordinates corresponding to the coordinates of the corner points of the first image according to the coordinates of the corner points of the first image, the tooling-based intrinsic parameters of the virtual camera corresponding to the device screen of the extended reality device, and a physical focal length of the virtual camera; and determining the first corresponding relationship according to the coordinates of the corner points of the first image and the normalized coordinates corresponding to the coordinates of the corner points of the first image.

In an optional embodiment of the present disclosure, the collecting the coordinates of the corner points of the first image and the second image by the screen calibration device comprises: normalizing, according to intrinsic parameters of the human-eye simulated camera, the coordinates of the corner points of the first image obtained by using the human-eye simulated camera to photograph the calibration target through the device screen of the extended reality device; and normalizing the coordinates of the corner points of the second image obtained by using the human-eye simulated camera to directly photograph the calibration target.

In an optional embodiment of the present disclosure, the converting the coordinates of the corner points of the first image and the coordinates of the corner points of the second image into first screen pixel coordinates and second screen pixel coordinates of the device screen of the extended reality device according to a first corresponding relationship comprises: converting the coordinates of the corner points of the first image and the coordinates of the corner points of the second image into the first screen pixel coordinates and the second screen pixel coordinates according to the first corresponding relationship and tooling-based intrinsic parameters of a virtual camera corresponding to the device screen of the extended reality device.

In a second aspect, an embodiment of the present disclosure further provides a screen calibration device for an extended reality device. The screen calibration device includes an acquisition module, a first processing module, and a second processing module.

The acquisition module is configured to collecting coordinates of corner points of a first image and a second image by the screen calibration device, where the first image is obtained by using a human-eye simulated camera to photograph a calibration target through a device screen of the extended reality device, and the second image is obtained by using the human-eye simulated camera to directly photograph the calibration target of the extended reality device.

The first processing module is configured to convert the coordinates of the corner points of the first image and the coordinates of the corner points of the second image into first screen pixel coordinates and second screen pixel coordinates of the device screen of the extended reality device according to a first corresponding relationship, where the first corresponding relationship is a corresponding relationship between calibrated pixels of the device screen of the extended reality device and coordinates of an image obtained by using the human-eye simulated camera to photograph the calibration target.

The second processing module is used to determine a refraction parameter of the device screen of the extended reality device according to the first screen pixel coordinates and the second screen pixel coordinates.

In a third aspect, an embodiment of the present disclosure further provides an electronic device, which includes a memory and a processor. Computer program stored in the memory is executable by the processor to implement operations comprising: collecting coordinates of corner points of a first image and a second image by the screen calibration device, where the first image is obtained by using a human-eye simulated camera to photograph a calibration target through a device screen of the extended reality device, and the second image is obtained by using the human-eye simulated camera to directly photograph the calibration target of the extended reality device; converting the coordinates of the corner points of the first image and the coordinates of the corner points of the second image into first screen pixel coordinates and second screen pixel coordinates of the device screen of the extended reality device according to a first corresponding relationship, wherein the first corresponding relationship is a corresponding relationship between calibrated pixels of the device screen of the extended reality device and coordinates of an image obtained by using the human-eye simulated camera to photograph the calibration target; and determining a refraction parameter of the device screen of the extended reality device according to the first screen pixel coordinates and the second screen pixel coordinates.

In a fourth aspect, an embodiment of the present disclosure further provides a non-transitory computer-readable storage medium. Computer program stored in the non-transitory computer-readable storage medium is executable by a processor to implement operations comprising: collecting coordinates of corner points of a first image and a second image by the screen calibration device, where the first image is obtained by using a human-eye simulated camera to photograph a calibration target through a device screen of the extended reality device, and the second image is obtained by using the human-eye simulated camera to directly photograph the calibration target of the extended reality device; converting the coordinates of the corner points of the first image and the coordinates of the corner points of the second image into first screen pixel coordinates and second screen pixel coordinates of the device screen of the extended reality device according to a first corresponding relationship, wherein the first corresponding relationship is a corresponding relationship between calibrated pixels of the device screen of the extended reality device and coordinates of an image obtained by using the human-eye simulated camera to photograph the calibration target; and determining a refraction parameter of the device screen of the extended reality device according to the first screen pixel coordinates and the second screen pixel coordinates.

In a fifth aspect, a screen calibration device for an extended reality device is provided, the screen calibration device for the extended reality device comprising an extended reality device support frame, a human-eye simulated camera, and a calibration target. The extended reality device support frame is used to place the extended reality device. The human-eye simulated camera is used to photograph the calibration target through the device screen of the extended reality device, and to photograph the calibration target without photographing the device screen of the extended reality device.

In a sixth aspect, the embodiments of the present disclosure further provide a computer program product or computer program. The computer program product or the computer program including computer instructions stored in a computer-readable storage medium. The processor of the computer device reads and executes the computer instructions from the computer-readable storage medium to implement the methods provided in the various optional implementations described in the embodiments of the present disclosure.

In an embodiment of the present disclosure, a screen calibration device of an extended reality device collects coordinates of corner points of a first image and a second image by the screen calibration device. The first image is obtained by using a human-eye simulated camera to photograph a calibration target through a device screen of the extended reality device, and the second image is obtained by using the human-eye simulated camera to directly photograph the calibration target of the extended reality device. The screen calibration device converts the coordinates of the corner points of the first image and the coordinates of the corner points of the second image into first screen pixel coordinates and second screen pixel coordinates of the device screen of the extended reality device according to a first corresponding relationship. The first corresponding relationship is a corresponding relationship between calibrated pixels of the device screen of the extended reality device and coordinates of an image obtained by using the human-eye simulated camera to photograph the calibration target. The screen calibration device determines a refraction parameter of the device screen of the extended reality device according to the first screen pixel coordinates and the second screen pixel coordinates, or according to the homography matrix determined by the first screen pixel coordinates and the second screen pixel coordinates, or according to distortion parameters optimized by the normalized coordinates of the human-eye simulated camera determined by the first screen pixel coordinates and the second screen pixel coordinates. The screen calibration method of an extended reality device according to an embodiment of the present disclosure can calibrate the refraction parameters of the device screen of the extended reality device. Furthermore, when the virtual image and the real image are superimposed and displayed, the display position of the virtual image can be adjusted according to the refraction parameters of the device screen of the extended reality device to ensure the accuracy of the human eye's perception of the fusion of virtual and real.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 3 illustrates a calibration target according to an embodiment of the present disclosure.

FIG. 4 is a flow chart of a screen calibration method for an extended reality device according to an embodiment of the present disclosure.

DESCRIPTION OF THE EMBODIMENTS

The drawings in this application to clearly and completely describe the technical solutions in this application. Obviously, the described embodiments are only part of the embodiments of the present disclosure, not all of them. Based on the embodiments in the present disclosure, all other embodiments obtained by those skilled in the art without creative work are within the scope of protection of the present disclosure.

The embodiments of the present disclosure provide a calibration method, device, electronic device and non-transitory computer-readable storage medium for an extended reality device. Specifically, the extended reality device involved in the embodiments of the present disclosure includes but is not limited to a head-mounted display and wearable glasses. A computing and processing unit may be built into or connected to the extended reality device. The extended reality device includes but is not limited to an airborne optical display system, i.e., a head-up display system, applied to vehicles such as aircraft, automobiles, and ships. The extended reality device includes but is not limited to an augmented reality hud-up display (AR-HUD) mounted on an intelligent networked car, a handheld mobile device such as a mobile phone, a desktop computer, a laptop computer, a tablet. The extended reality device includes but is not limited to a wearable near-eye display system such as a head-mounted display, smart glasses. When the extended reality device is a wearable head-mounted display or smart glasses, a computing and processing unit may be built into or connected to the extended reality device.

Figure 1:
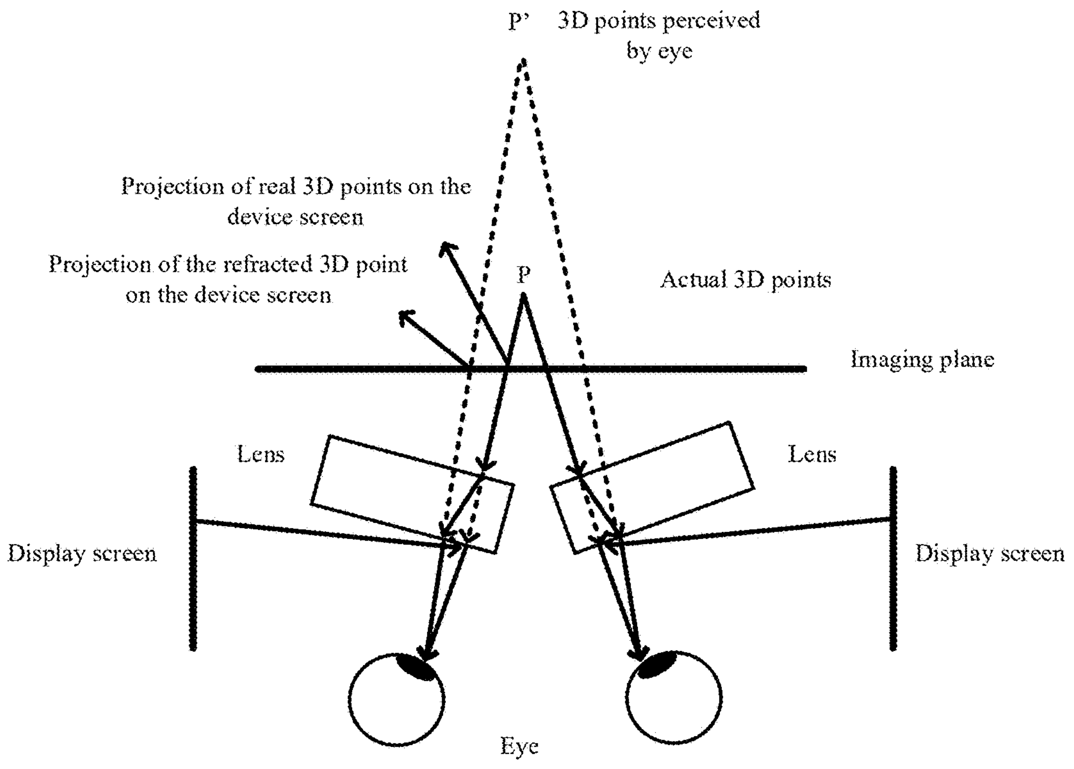
FIG. 1 illustrates a refraction process caused by an extended reality device according to an embodiment of the present disclosure.
Figure 2:
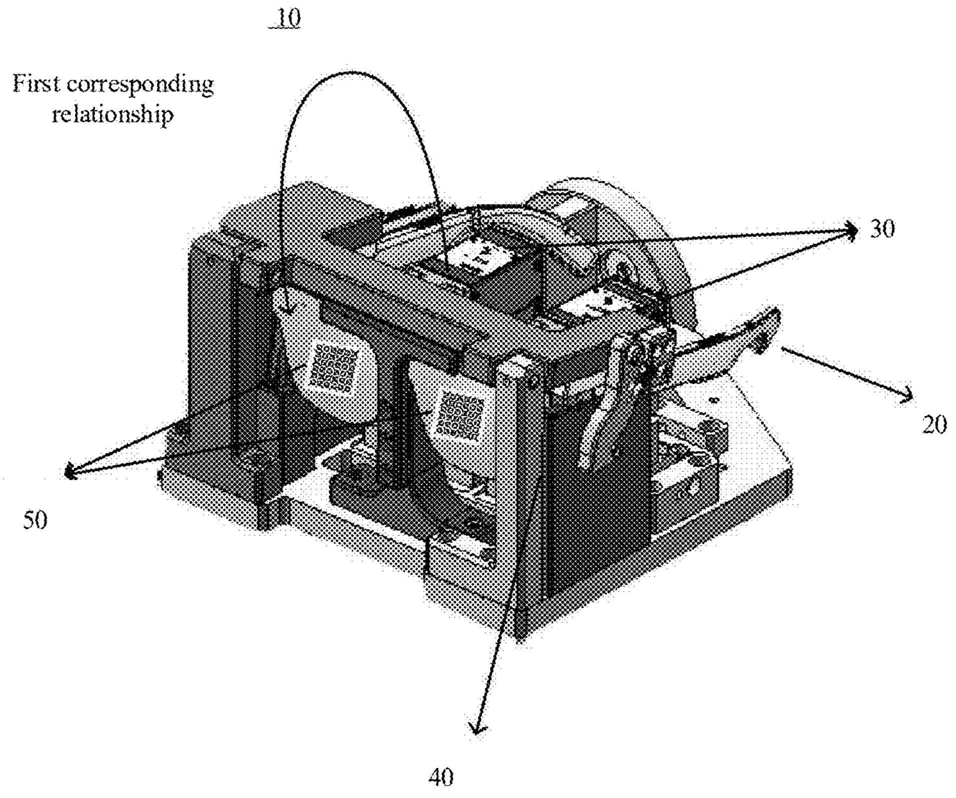
FIG. 2 illustrates a screen calibration device for an extended reality device according to an embodiment of the present disclosure.

Please refer to FIG. 2 illustrating a screen calibration device for an extended reality device according to an embodiment of the present disclosure.

The screen calibration device 10 of an extended reality device comprises: an extended reality device support frame 20, a human-eye simulated camera 30, a fixture 40 for fixing the human-eye simulated camera 30, and a calibration target 50.

For the sake of clarity, FIG. 3 depicts a calibration target 50 according to an embodiment of the present disclosure.

Although not shown in the figure, the screen calibration device of the extended reality device also includes a computing and processing unit which is used to control the device screen of the extended reality device to project the calibration target 50, adjust the human-eye simulated camera 30, determine coordinates of the corner points of the first image and coordinates of the corner points of the second image, determine first screen pixel coordinates and the second screen pixel coordinates according to the first corresponding relationship, and determine the refraction parameters of the device screen of the extended reality device according to the first screen pixel coordinates and the second screen pixel coordinates, etc. The computing and processing unit can be built into the screen calibration device of the extended reality device, and can be connected to the screen calibration device 10 of the extended reality device by wire, which is not limited in the embodiment of the present disclosure.

In the embodiment of the present disclosure, the human-eye simulated camera 30 is used to photograph a calibration target through a device screen of the extended reality device, and to directly photograph the calibration target.

The device screen of the extended reality device includes a left display screen and a right display screen, and the human-eye simulated camera 30 includes a left human-eye simulated camera and a right human-eye simulated camera. In the following description of the embodiment of the present disclosure, the left and right display screens and the left and right human-eye simulated cameras are not described separately. It is assumed that the device screen of the extended reality device represents left and right display screens, the human-eye simulated camera 30 represents left and right human-eye simulated cameras, the calibration target image represents target images displayed on the left and right display screens, and the calibration target images taken by the human-eye simulated cameras are the calibration target images displayed on the left and right display screens. A unified description is given here and no further details are given below.

Please refer to FIG. 4 illustrating a flow chart of a screen calibration method for an extended reality device according to an embodiment of the present disclosure. The method includes the following blocks S401-S403.

At block S401, coordinates of corner points of a first image and a second image are collected by the screen calibration device.

In an embodiment of the present disclosure, the first image is obtained by using a human-eye simulated camera to photograph a calibration target through a device screen of the extended reality device. The second image is obtained by using the human-eye simulated camera to directly photograph the calibration target of the extended reality device.

Specifically, when the screen calibration device is not placed in the extended reality device, the human-eye simulated camera shoots the calibration target to obtain the calibration target image. That is, the human-eye simulated camera shoots the calibration target to obtain the calibration target image through the device screen of the extended reality device. When the screen calibration device is placed in the extended reality device, the human-eye simulated camera shoots the calibration target image projected on the device screen of the extended reality device, that is, the human-eye simulated camera shoots the calibration target image through the device screen of the extended reality device.

For example, the coordinates of the corner points of the first image may be $u_g$, and the coordinates of the corner points of the second image may be $u_n$.

For example, the calibration target image may be a checkerboard calibration target image, or the calibration target image may be other calibration target images, which is not limited in the embodiments of the present disclosure.

Optionally, obtaining the coordinates of the corner points of the first image and the coordinates of the corner points of the second image includes:

According to the tooling-based intrinsic parameters of the human-eye simulated camera, the coordinates of the corner points of the first image corresponding to the calibration target image taken by the human-eye simulated camera through the device screen of the extended reality device are normalized. The coordinates of the corner points of the second image corresponding to the calibration target image taken by the human-eye simulated camera not through the device screen of the extended reality device are normalized.

Exemplarily, the corresponding mark number on the calibration target image can be associated with the corner point coordinates ug of the first image and the corner point coordinates $u_n$ of the second image, and then based on the tooling tooling-based intrinsic parameter $K^C$ of the human-eye simulated camera, the corner point coordinates $u_g$ of the first image and the corner point coordinates $u_n$ of the second image are converted into normalized corner point coordinates $p_g$ of the first image and normalized corner point coordinates $p_n$ of the second image.

At block S402, convert the coordinates of the corner points of the first image and the coordinates of the corner points of the second image into first screen pixel coordinates and second screen pixel coordinates of the device screen of the extended reality device according to the first corresponding relationship.

In the embodiment of the present disclosure, the first corresponding relationship is a corresponding relationship between calibrated pixels of the device screen of the extended reality device and coordinates of an image obtained by using the human-eye simulated camera to photograph the calibration target.

Exemplarily, the first corresponding relationship can be expressed as [R, t], the first screen pixel coordinate can be $$u_g^s,$$

and the second screen pixel coordinate can be $$u_n^s.$$

Optionally, converting the coordinates of the corner points of the first image and the coordinates of the corner points of the second image into first screen pixel coordinates and second screen pixel coordinates of a device screen of the extended reality device according to the first corresponding relationship includes: converting the coordinates of the corner points of the first image and the coordinates of the corner points of the second image into the first screen pixel coordinates and the second screen pixel coordinates according to the first corresponding relationship and tooling-based intrinsic parameters of a virtual camera corresponding to the device screen of the extended reality device.

It should be noted that the coordinates of the corner points of the first image are normalized coordinates of the corner points of the first image and normalized coordinates. The coordinates of the corner points of the second image are normalized coordinates of the corner points of the second image.

Specifically, the normalized coordinates of the corner points of the first image and the coordinates of the corner points of the second image can be converted into the virtual human eye camera coordinate system corresponding to the device screen of the extended reality device according to the first corresponding relationship. The normalized coordinates of corner points of the first image can be converted into first screen pixel coordinates according to the tooling tooling-based intrinsic parameters of the virtual camera corresponding to the device screen of the extended reality device, and the normalized coordinates of the corner points of the second image can be converted into second screen pixel coordinates.

In the embodiment of the present disclosure, the first corresponding relationship is expressed as follows:

$$p = K^{c-1}\tilde{u},$$

$$\begin{bmatrix} x^D \\ y^D \\ Z^D \end{bmatrix} = R^{-1}(p - t),$$

$$\tilde{u}^s = K^D \begin{bmatrix} \frac{x^D}{z^D} \\ \frac{y^D}{Z^D} \\ 1 \end{bmatrix},$$

where ~ represents homogeneous coordinates, the superscript D represents the virtual camera coordinate system corresponding to the device screen of the extended reality device, and the superscript s represents the pixels of the device screen of the extended reality device.

At block S403, determine a refraction parameter of the device screen of the extended reality device according to the first screen pixel coordinates and the second screen pixel coordinates.

Optionally, pixel corners beyond the device screen of the extended reality device may be removed, so that the obtained refraction parameters of the device screen of the extended reality device are more accurate.

Optionally, the screen calibration method of the extended reality device provided in the embodiment of the present disclosure further includes: determining the first corresponding relationship.

The determining the first corresponding relationship includes:

normalizing the coordinates of the corner points of the first image according to the tooling-based intrinsic parameters of the virtual camera corresponding to the device screen of the extended reality device, and a physical focal length of the virtual camera; and determining the first corresponding relationship according to the corner point coordinates of the first image and the normalized coordinates of the corner points of the first image.

Exemplarily, determining the first corresponding relationship includes the following operations:

Operation 1: Extract the corner points of the first image to obtain the 2D coordinates of the first image on the device screen of the extended reality device. For example, the calibration target image is a virtual chessboard calibration target image, where the number of rows of the virtual chessboard calibration target image is $n_{row}$, the number of columns is $n_{col}$, the width is $d_{size}$, the number of rows of the corner points of the first image is $n_{row}$, the number of columns of the corner points of the first image is $n_{col}$, and the image resolution of the device screen of the extended reality device is $W_D \times H_D$. The 2D coordinates of the virtual chessboard corner point of the i-th row and j-th column of the first image on the device screen of the extended reality device can be obtained as:

$$u^D_{gij} = \begin{bmatrix} \frac{W_D - n_{cow}d_{size}}{2} + d_{size} * j \\ \frac{H_D - n_{row}d_{size}}{2} d_{size} * i \end{bmatrix}$$

Operation 2: According to the 2D coordinates $$u^D_{gij}$$

of the first image, the tooling tooling-based intrinsic parameter KD of the virtual camera corresponding to the device screen of the extended reality device, and the physical focal length f D of the virtual camera, the normalized 3D coordinates corresponding to the coordinates of the corner points of the first image can be determined as:

$$P^D_{ij} = f^D K^{D-1} \tilde{u}^D_{gij}$$

where ~ represents homogeneous coordinates.

Operation 3: Determine the first corresponding relationship according to the 2D coordinates of the first image and the 3D coordinates of the first image:

$$\begin{bmatrix} x_{ij} \\ y_{ij} \\ z_{ij} \end{bmatrix} = \left(Rp^D_{ij} + t\right),$$

$$\underset{R,\,t}{\arg\min} \sum_{i=0}^{n_{row}} \sum_{j=0}^{n_{col}} \left\| K^{C-1}\tilde{u}_{gij} - \begin{bmatrix} \frac{x_{ij}}{z_{ij}} \\ \frac{y_{ij}}{z_{ij}} \\ 1 \end{bmatrix} \right\|^2,$$

where $K^C$ represents the tooling-based intrinsic parameter of the human-eye simulated camera, $P_{ij}$ represents the 3D coordinates of the first image, $u_{gij}$ is the homogeneous coordinate corresponding to the 2D coordinates of the first image, [R, t] represents the first corresponding relationship, and R and t represent the rotation and translation relationships in the conversion relationship between the human-eye simulated camera and the device screen of the extended reality device, respectively.

Figure 5:
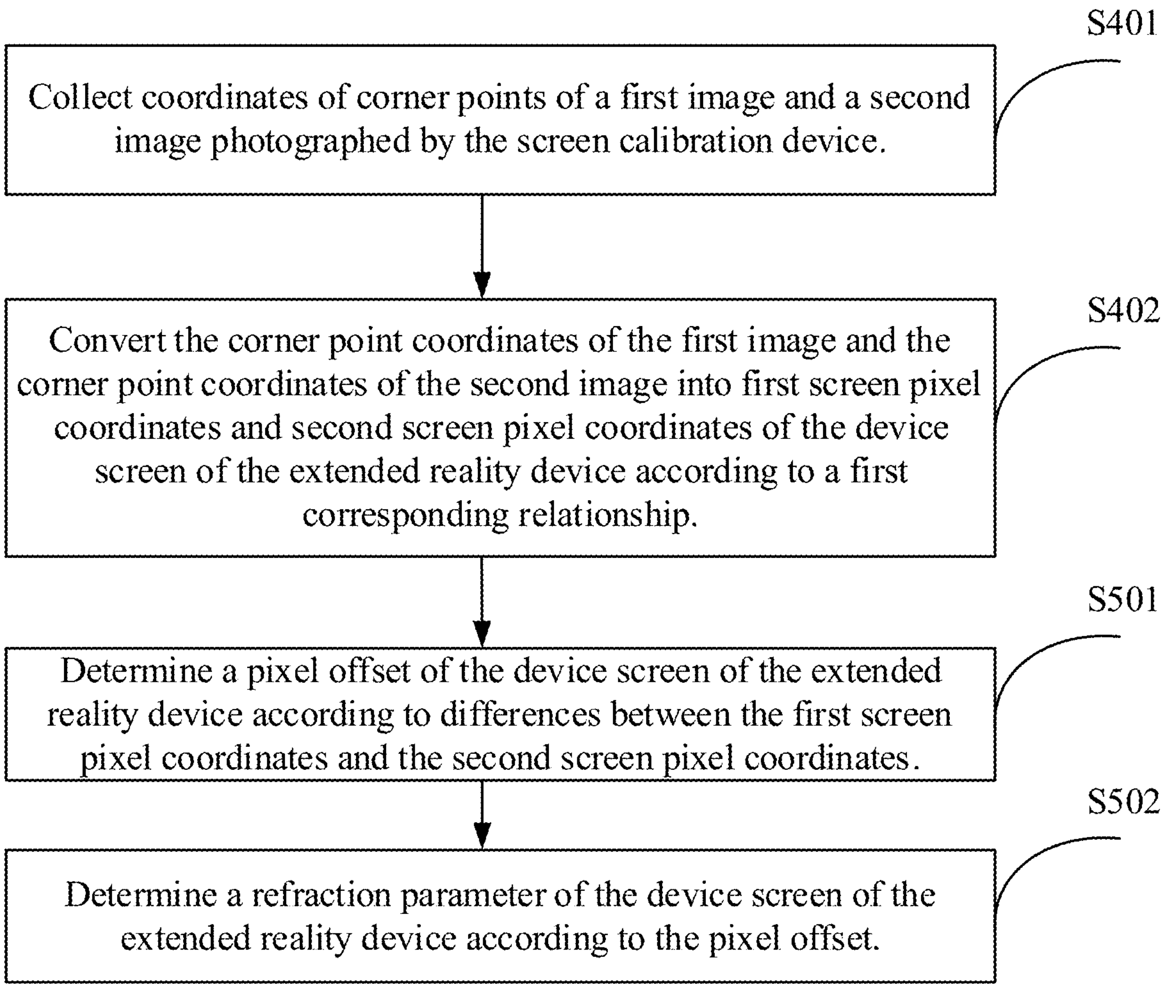
FIG. 5 illustrates a flow chart of a screen calibration method of an extended reality device according to another embodiment of the present disclosure.

As shown in FIG. 5, according to a possible implementation of the block S403, the operation of determining the refraction parameter of the device screen of the extended reality device according to the first screen pixel coordinates and the second screen pixel coordinates includes blocks S501 and S502.

At block S501, determine a pixel offset of a device screen of an extended reality device according to a difference between a first screen pixel coordinate and a second screen pixel coordinate.

At block S502, determine a refraction parameter of a device screen of the extended reality device according to the pixel offset.

In the embodiment of the present disclosure, the refraction parameters of the device screen of the extended reality device determined by the pixel offset $u_{shift}$ are as follows:

$$u_{shift} = u_g^s - u_n^s.$$

Through this implementation, the refraction parameter of the device screen of the extended reality device can be directly determined according to the difference between the first screen pixel coordinates and the second screen pixel coordinates. The modeling method is relatively simple and has universal applicability. In addition, there is no need for a camera on the extended reality device, which is more friendly to extended reality devices without cameras.

Figure 6:
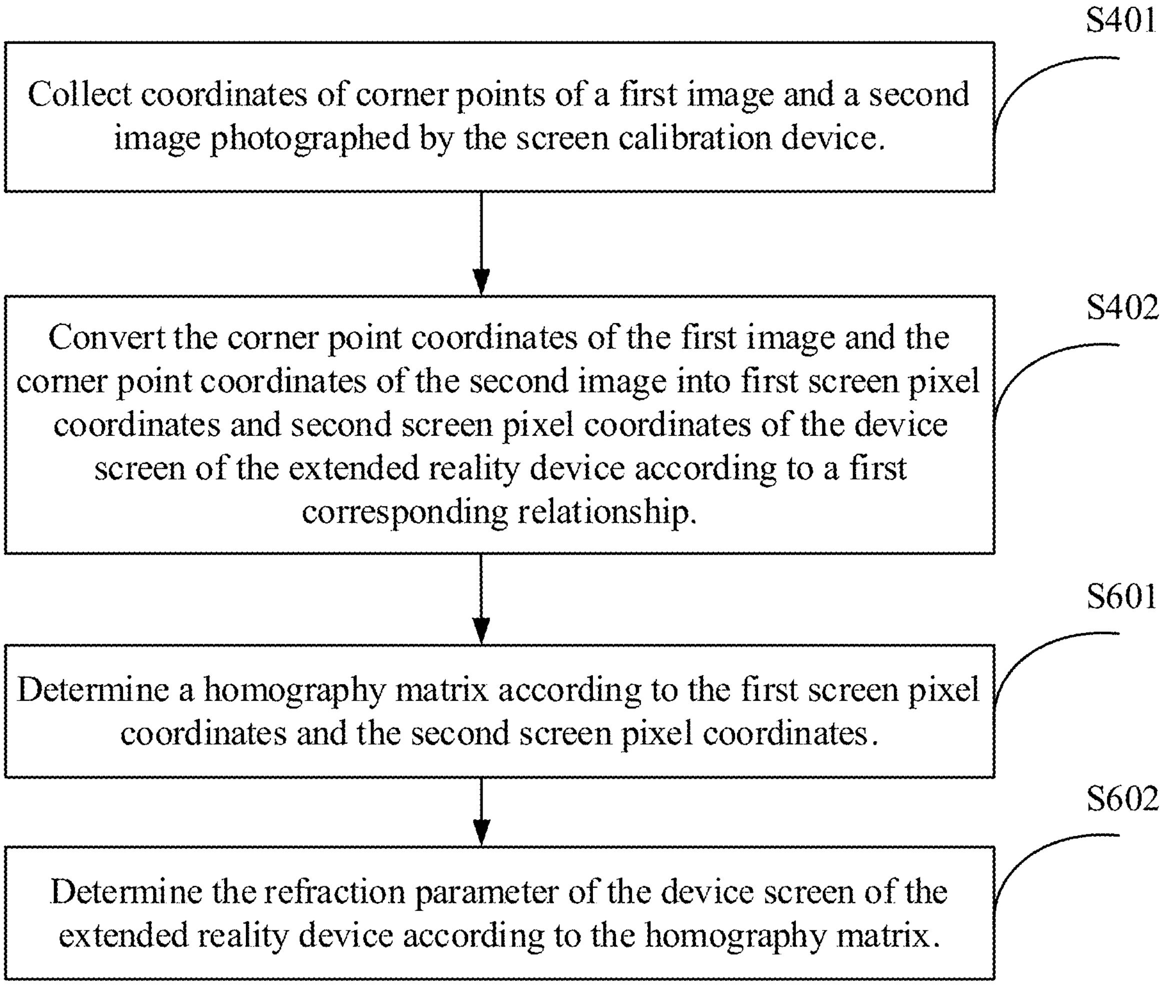
FIG. 6 illustrates a flow chart of a screen calibration method of an extended reality device according to still another embodiment of the present disclosure.

In a possible implementation, as shown in FIG. 6, operation S403, determining the refraction parameter of the device screen of the extended reality device according to the first screen pixel coordinates and the second screen pixel coordinates, includes:

S601, determining a homography matrix according to the first screen pixel coordinates and the second screen pixel coordinates.

For example, the homography matrix can be as follows:

$$u_g = Hu_n.$$

In the embodiment of the present disclosure, the operation of determining a homography matrix according to the first screen pixel coordinates and the second screen pixel coordinates includes: determining a first matrix according to the first screen pixel coordinates and the second screen pixel coordinates, performing singular value decomposition on the row vectors of the first matrix to obtain a solution corresponding to the minimum singular value; and normalizing the solution corresponding to the minimum singular value to obtain the homography matrix.

Specifically, the operation of determining the homography matrix may include the following operations:

The first screen pixel coordinates and the second screen pixel coordinates are one-to-one corresponding matching points. The specific coordinates can be written as:

$$((x_i, y_i)) \text{ and } ((x_i', y_i')).$$

Then for each pair of matching points:

$$\begin{cases} x_i' = \dfrac{h_{11}x_i + h_{12}y_i + h_{13}}{h_{31}x_i + h_{32}y_i + h_{33}} \\ y_i' = \dfrac{h_{21}x_i + h_{22}y_i + h_{23}}{h_{31}x_i + h_{32}y_i + h_{33}} \end{cases}$$

By shifting the phase and rearranging, the nonlinear equation can be converted into the form of a linear system of equations:

$$\begin{cases} x_i'(h_{31}x_i + h_{32}y_i + h_{33}) = h_{11}x_i + h_{12}y_i + h_{13} \\ y_i'(h_{31}x_i + h_{32}y_i + h_{33}) = h_{21}x_i + h_{22}y_i + h_{23} \end{cases}$$

Further sorting can be obtained:

$$\begin{cases} x_ix_i'h_{31} + y_ix_i'h_{32} + x_i'h_{33} - x_ih_{11} - y_ih_{12} - h_{13} = 0 \\ x_iy_i'h_{31} + y_iy_i'h_{32} + y_i'h_{33} - x_ih_{21} - y_ih_{22} - h_{23} = 0 \end{cases}$$

Then it can be written in the form of the first matrix:

$$Ah = 0.$$

where h contains the column vector of the homography matrix elements.

By performing singular value decomposition (SVD) on the row vector A of the first matrix, the solution corresponding to the minimum singular value can be obtained, and then it is normalized so that $h_{33}$ is 1, and the homography matrix can be obtained.

S602, determining a refraction parameter of a device screen of an extended reality device according to the homography matrix.

Through this implementation method, based on the modeling method of the homography matrix, the refraction parameters of the device screen of the extended reality device can be determined, which is universal. Furthermore, there is no need for a camera on the extended reality device, which is more friendly to extended reality devices without a camera. In addition, the amount of data required is small, the efficiency is high, and it is more friendly to mass-produced extended reality devices. The refraction parameters that need to be stored are also greatly reduced, and the amount of calculation required for real-time rendering is small.

Figure 7:
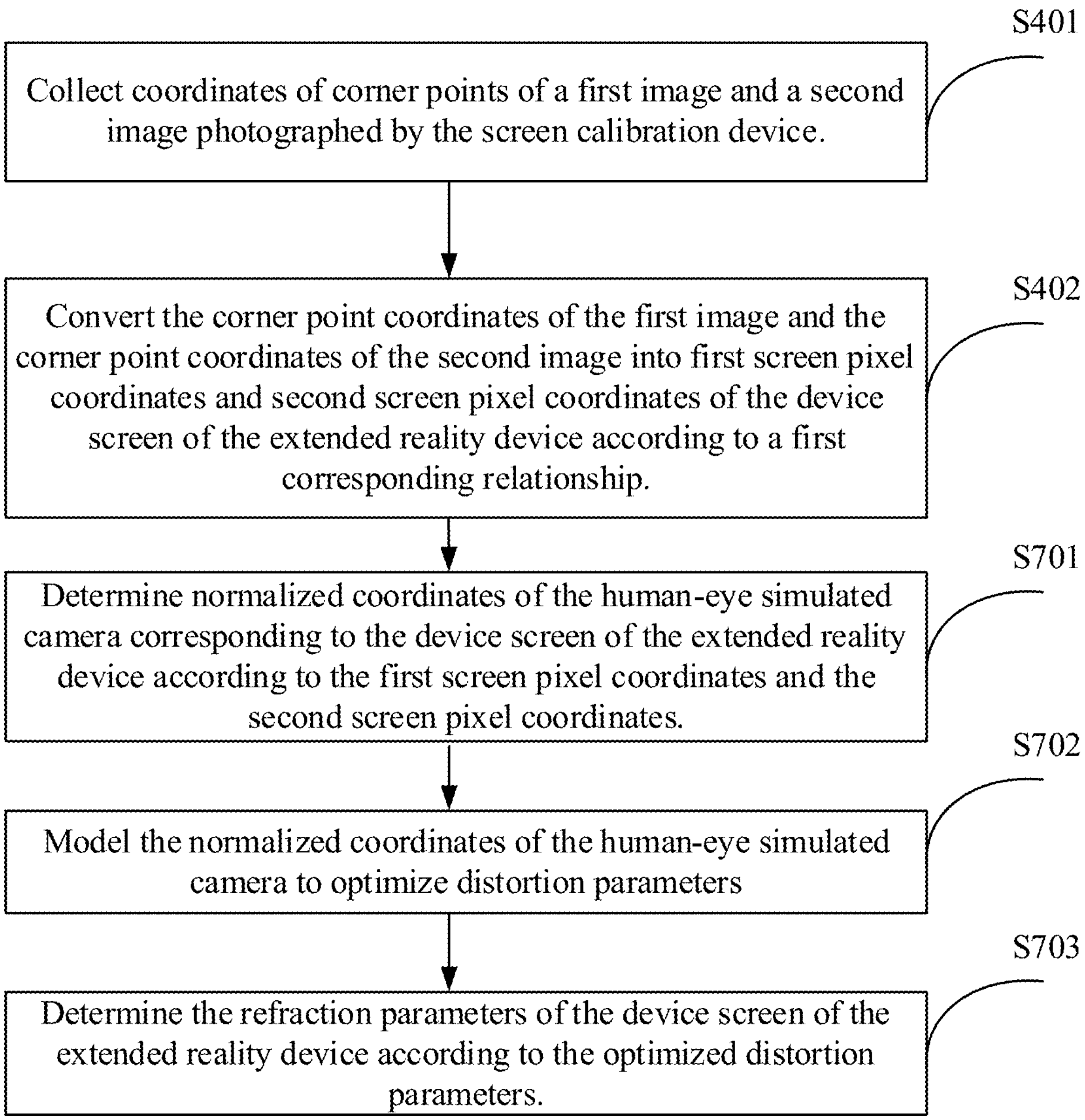
FIG. 7 illustrates a flow chart of a screen calibration method of an extended reality device according to another embodiment of the present disclosure.

As shown in FIG. 7, according to another possible implementation of the block S403, the operation of determining the refraction parameter of the device screen of the extended reality device according to the first screen pixel coordinates and the second screen pixel coordinates, includes blocks S701, S702 and S703.

At block S701, determine normalized coordinates of a human-eye simulated camera corresponding to a device screen of an extended reality device according to first screen pixel coordinates and second screen pixel coordinates.

In an embodiment of the present disclosure, the operation of determining the normalized coordinates of the human-eye simulated camera corresponding to the device screen of the extended reality device according to the first screen pixel coordinates and the second screen pixel coordinates includes:

The normalized coordinates of the human-eye simulated camera corresponding to the device screen of the extended reality device are determined according to the first screen pixel coordinates, the second screen pixel coordinates, and the virtual camera tooling tooling-based intrinsic parameters corresponding to the device screen of the extended reality device.

Exemplarily, the first screen pixel coordinates may be converted into a normalized plane of a virtual camera corresponding to the device screen of the extended reality device $$u_g^D = (x_g^D, y_g^D),$$

and the second screen pixel coordinates may be converted into a normalized plane of a virtual camera corresponding to the device screen of the extended reality device $$u_n^D = (x_n^D, y_n^D).$$

The conversion formula is as follows:

$$\begin{bmatrix} x^D \\ y^D \\ 1 \end{bmatrix} = K^{D-1}\tilde{u}^s.$$

At block S702, model the normalized coordinates and optimize the distortion parameters.

Specifically, the obtained normalized coordinates are modeled using a distortion model to optimize the distortion parameters. The formula is as follows:

$$\begin{bmatrix} x_g^D \\ y_g^D \end{bmatrix}_{est} =$$

$$D(x_n^D, y_n^D) = \begin{bmatrix} x_n^D(1 + k_1 r^2 + k_2 r^4 + k_3 r^6) + 2p_1 x_n^D y_n^D + p_2(r^2 + 2x_n^{D^2}) \\ y_n^D(1 + k_1 r^2 + k_2 r^4 + k_3 r^6) + 2p_2 x_n^D y_n^D + p_1(r^2 + 2y_n^{D^2}) \end{bmatrix},$$

$$\underset{k_1, k_2, k_1, p_1, p_2}{\arg\min} \left\| \begin{bmatrix} x_g^D \\ y_g^D \end{bmatrix}_{est} - \begin{bmatrix} x_g^D \\ y_g^D \end{bmatrix} \right\|^2,$$

$$\text{where } r^2 = (x_n^D)^2 + (y_n^D)^2,$$

$k_1$, $k_2$, $k_3$ represent radial distortion, and $P_1$, $P_2$ represent tangential distortion.

Figure 8:
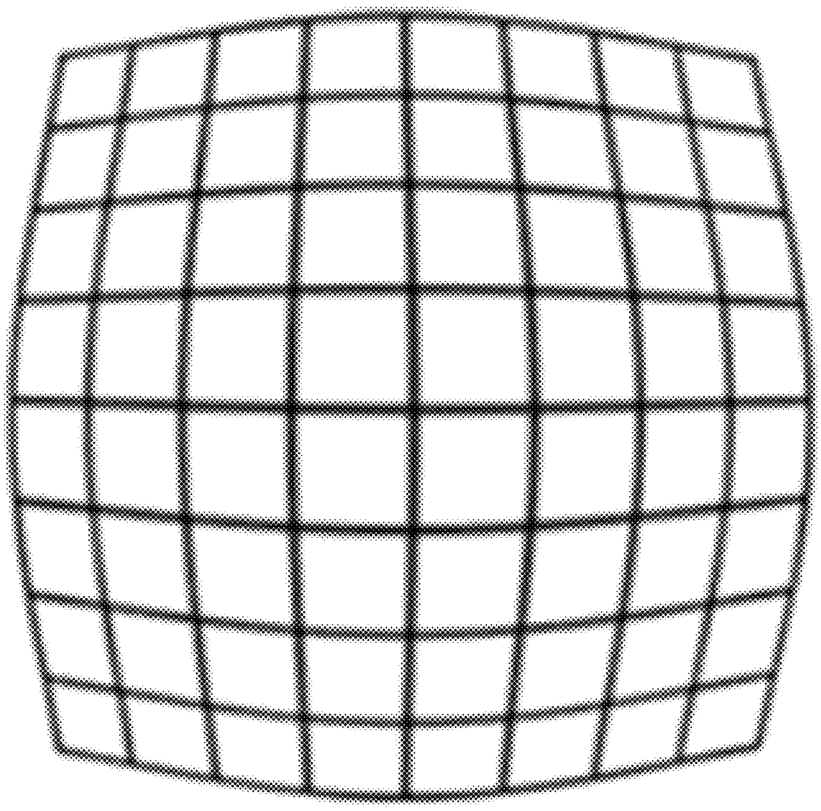
FIG. 8 is a diagram of barrel distortion.
Figure 9:
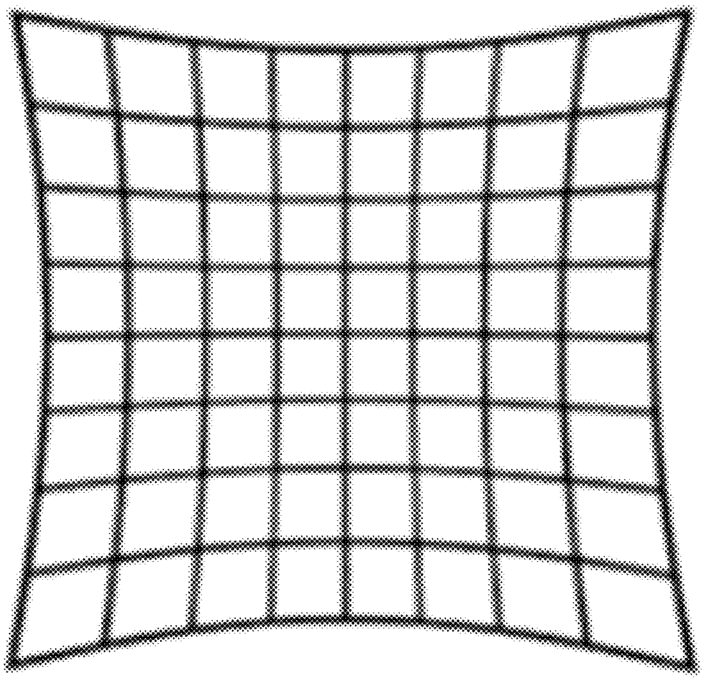
FIG. 9 is a diagram of pincushion distortion.
Figure 10:
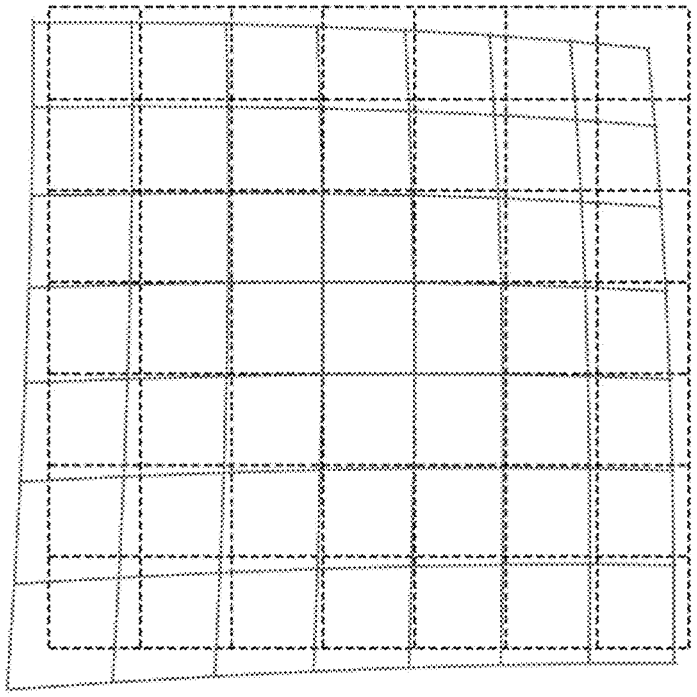
FIG. 10 is a diagram of tangential distortion.

Exemplarily, FIG. 8 illustrates barrel distortion, FIG. 9 illustrates pincushion distortion, and FIG. 10 illustrates tangential distortion. By modeling the distortion model, the distortion parameters can be optimized and solved.

At block S703, determine a refraction parameter of a device screen of the extended reality device according to the optimized distortion parameter.

Through this implementation method, modeling based on the distortion model can determine the refraction parameters of the device screen of the extended reality device, which is universal. Furthermore, there is no need for a camera on the extended reality device, which is more friendly to extended reality devices without a camera. In addition, the amount of data required is small, the efficiency is high, and it is more friendly to mass-produced extended reality devices. The refraction parameters that need to be stored are also greatly reduced, and the amount of calculation required for real-time rendering is small.

In summary, in the embodiment of the present disclosure, the screen calibration device of the extended reality device obtains the coordinates of the corner points of the first image obtained by taking a calibration target image through the device screen of the extended reality device by simulating the human eye camera and the coordinates of the corner points of the second image obtained by not taking a calibration target image through the device screen of the extended reality device, and converts the coordinates of the corner points of the first image and the second image into the first screen pixel coordinates and the second screen pixel coordinates of the device screen of the extended reality device according to the first corresponding relationship between the device screen of the calibrated extended reality device and the coordinates of the calibration target image taken by the human-eye simulated camera, and then determines the refraction parameters of the device screen of the extended reality device according to the pixel offset determined by the first screen pixel coordinates and the second screen pixel coordinates, or determines the refraction parameters of the device screen of the extended reality device according to the homography matrix determined by the first screen pixel coordinates and the second screen pixel coordinates, or determines the refraction parameters of the device screen of the extended reality device according to the distortion parameters optimized by the normalized coordinates of the human-eye simulated camera determined by the first screen pixel coordinates and the second screen pixel coordinates. The screen calibration method of the extended reality device provided in the embodiment of the present disclosure can calibrate the pixel offset of the device screen of the extended reality device. Furthermore, when the virtual image and the real image are superimposed and displayed, the display position of the virtual image can be adjusted according to the refraction parameters of the device screen of the extended reality device to ensure the accuracy of the human eye's perception of the fusion of virtual and real.

In order to better implement the screen calibration method of the extended reality device of the present disclosure, the present disclosure also provides a screen calibration device of the extended reality device based on the screen calibration method of the extended reality device. The meanings of the terms are the same as those in the screen calibration method of the extended reality device, and the specific implementation details can refer to the description in the method embodiment.

Figure 11:
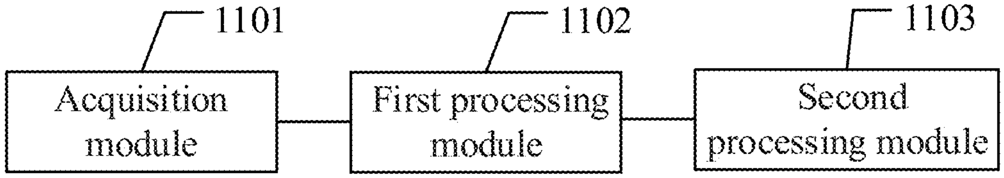
FIG. 11 illustrates a block diagram of a screen calibration device for an extended reality device according to an embodiment of the present disclosure.

Please refer to FIG. 11 illustrating a block diagram of a screen calibration device for an extended reality device according to an embodiment of the present disclosure. The device includes an acquisition module 1101, a first processing module 1102, and a second processing module 1103.

The acquisition module 1101 is configured to collect coordinates of corner points of a first image and a second image photographed by the screen calibration device. The first image is obtained by using a human-eye simulated camera to photograph a calibration target through a device screen of the extended reality device, and the second image is obtained by using the human-eye simulated camera to directly photograph the calibration target.

The first processing module 1102 is used to convert the corner point coordinates of the first image and the corner point coordinates of the second image into first screen pixel coordinates and second screen pixel coordinates of the device screen of the extended reality device according to a first corresponding relationship. The first corresponding relationship is a corresponding relationship between calibrated pixels of the device screen of the extended reality device and coordinates of an image obtained by using the human-eye simulated camera to photograph the calibration target.

The second processing module 1103 is used to determine a refraction parameter of the device screen of the extended reality device according to the first screen pixel coordinates and the second screen pixel coordinates.

Optionally, in a possible implementation, the second processing module 1103 includes a second processing unit configured to determine a pixel offset of the device screen of the extended reality device according to differences between the first screen pixel coordinates and the second screen pixel coordinates.

The second processing unit is further used to determine the refraction parameter of the device screen of the extended reality device according to the pixel offset.

Optionally, in a possible implementation, the second processing module 1103 includes a second processing unit configured to determine a homography matrix according to the first screen pixel coordinates and the second screen pixel coordinates.

The second processing unit is further used to determine the refraction parameters of the device screen of the extended reality device according to the homography matrix.

Optionally, in the embodiment of the present disclosure, the second processing unit is configured to determine a first matrix according to the first screen pixel coordinates and the second screen pixel coordinates, perform singular value decomposition on row vectors of the first matrix to obtain a solution corresponding to a minimum singular value, and normalize the solution corresponding to the minimum singular value to obtain the homography matrix.

Optionally, in a possible implementation, the second processing module 1103 includes a second processing unit.

The second processing unit is configured to determine coordinates of the human-eye simulated camera corresponding to the device screen of the extended reality device according to the first screen pixel coordinates and the second screen pixel coordinates.

The second processing unit is further used to model the normalized coordinates of the human-eye simulated camera to optimize distortion parameters.

The second processing unit is also used to determine the refraction parameters of the device screen of the extended reality device according to the optimized distortion parameters.

Optionally, in the embodiment of the present disclosure, the second processing unit can determine the normalized coordinates of the human-eye simulated camera corresponding to the device screen of the extended reality device according to the first screen pixel coordinates, the second screen pixel coordinates, and tooling-based intrinsic parameters of the virtual camera corresponding to the device screen of the extended reality device.

Optionally, in the embodiment of the present disclosure, the device further includes a third processing unit for determining the first corresponding relationship.

The third processing unit can normalize the coordinates of the corner points of the first image according to the tooling-based intrinsic parameters of the virtual camera corresponding to the device screen of the extended reality device, and a physical focal length of the virtual camera. The third processing unit can determine the first corresponding relationship according to the corner point coordinates of the first image and the normalized coordinates of the corner points of the first image.

Optionally, in the embodiment of the present disclosure, the acquisition module 1101 includes a fourth processing unit, configured to determine, according to the tooling-based intrinsic parameters of the human-eye simulated camera, the normalized first image corner point coordinates under the human-eye simulated camera corresponding to the calibration target image captured by the human-eye simulated camera through the device screen of the extended reality device.

It is used to determine the normalized coordinates of the corner points of the second image under the human-eye simulated camera corresponding to the calibration target image taken by the human-eye simulated camera without passing through the device screen of the extended reality device.

Optionally, in the embodiment of the present disclosure, the first processing module 1102 includes a first processing unit configured to convert the coordinates of the corner points of the first image and the coordinates of the corner points of the second image into the first screen pixel coordinates and the second screen pixel coordinates according to the first corresponding relationship and the virtual camera tooling tooling-based intrinsic parameters corresponding to the device screen of the extended reality device.

In the embodiment of the present disclosure, the acquisition module 1101 acquires the coordinates of the corner points of the first image obtained by simulating the human eye camera through the device screen of the extended reality device and the coordinates of the corner points of the second image obtained by not taking the calibration target image through the device screen of the extended reality device, and the first processing module 1102 converts the coordinates of the corner points of the first image and the coordinates of the corner points of the second image into the first screen pixel coordinates and the second screen pixel coordinates of the device screen of the extended reality device according to the first correspondence between the device screen of the calibrated extended reality device and the coordinates of the calibration target image taken by the human-eye simulated camera; the second processing module 1103 determines the refraction parameters of the device screen of the extended reality device according to the first screen pixel coordinates and the second screen pixel coordinates. The screen calibration device of the extended reality device provided in the embodiment of the present disclosure can calibrate the refraction parameters of the device screen of the extended reality device. Furthermore, when the virtual image and the real image are superimposed and displayed, the display position of the virtual image can be adjusted according to the refraction parameters of the device screen of the extended reality device to ensure the accuracy of the human eye in feeling the fusion of virtual and real.

Figure 12:
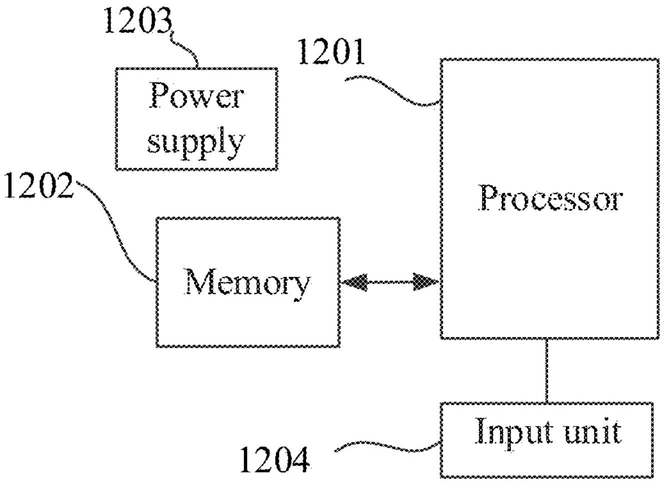
FIG. 12 is a block diagram of an electronic device according to an embodiment of the present disclosure.

In addition, refer to FIG. 12 illustrating a block diagram of an electronic device according to an embodiment of the present disclosure. The electronic device includes a processor 1201 of one or more processing cores, a memory 1202 of one or more computer-readable storage media, a power supply 1203, and an input unit 1204. Those skilled in the art will appreciate that the electronic device structure shown in FIG. 12 does not limit the electronic device, and may include more or fewer components than shown in the figure, or combine certain components, or arrange the components differently.

The processor 1201 is the control center of the electronic device. It uses various interfaces and lines to connect various parts of the entire electronic device. By running or executing software programs and/or modules stored in the memory 1202 and calling data stored in the memory 1202, it performs various functions of the electronic device and processes data, thereby monitoring the electronic device as a whole. Optionally, the processor 1201 may include one or more processing cores; preferably, the processor 1201 may integrate an application processor and a modem processor, wherein the application processor mainly processes the operating system, user interface, and application programs, and the modem processor mainly processes wireless communications. It is understandable that the above-mentioned modem processor may not be integrated into the processor 1201.

The memory 1202 can be used to store software programs and modules. The processor 1201 executes various functional applications and data processing by running the software programs and modules stored in the memory 1202. The memory 1202 can mainly include a program storage area and a data storage area, wherein the program storage area can store an operating system, an application required for at least one function (such as a sound playback function, an image playback function). The data storage area can store data created according to the use of the electronic device, etc. In addition, the memory 1202 can include a high-speed random access memory, and can also include a non-volatile memory, such as at least one disk storage device, a flash memory device, or other volatile solid-state storage devices. Accordingly, the memory 1202 includes a memory controller to control the processor 1201 access to the memory 1202.

The power supply 1203 is used for supplying power to each component. Preferably, the power supply 1203 can be logically connected to the processor 1201 through a power management system, so that the power management system can manage charging, discharging, power consumption, etc. The power supply 1203 can also include one or more DC or AC power supplies, recharging systems, power supply device debugging circuits, power converters or inverters, power status indicators, and other arbitrary components.

The electronic device may further include an input unit 1204, which may be used to receive input digital or character information and generate keyboard, mouse, joystick, optical or trackball signal input related to user settings and function control.

Although not shown, the electronic device may further include a display unit, etc., which will not be described in detail herein. Specifically in this embodiment, the processor 1201 in the electronic device will load the executable file corresponding to the process of one or more application programs into the memory 1202 according to the following instructions, and the processor 1201 will run the application program stored in the memory 1202, thereby implementing operations to realize the screen calibration method of extended reality device provided in the embodiments of the present disclosure. The operations include: collecting coordinates of corner points of a first image and a second image photographed by the screen calibration device, wherein the first image is obtained by using a human-eye simulated camera to photograph a calibration target through a device screen of the extended reality device, and the second image is obtained by using the human-eye simulated camera to directly photograph the calibration target; converting the coordinates of the corner points of the first image and the coordinates of the corner points of the second image into first screen pixel coordinates and second screen pixel coordinates of the device screen of the extended reality device according to a first corresponding relationship, wherein the first corresponding relationship is a corresponding relationship between calibrated pixels of the device screen of the extended reality device and coordinates of an image obtained by using the human-eye simulated camera to photograph the calibration target; and determining a refraction parameter of the device screen of the extended reality device according to the first screen pixel coordinates and the second screen pixel coordinates.

In an optional embodiment of the present disclosure, the determining the refraction parameter of the device screen of the extended reality device according to the first screen pixel coordinates and the second screen pixel coordinates comprises: determining a pixel offset of the device screen of the extended reality device according to differences between the first screen pixel coordinates and the second screen pixel coordinates, and determining a refraction parameter of the device screen of the extended reality device according to the pixel offset.

In an optional embodiment of the present disclosure, the determining the refraction parameter of the device screen of the extended reality device according to the first screen pixel coordinates and the second screen pixel coordinates comprises: determining a homography matrix according to the first screen pixel coordinates and the second screen pixel coordinates, and determining the refraction parameter of the device screen of the extended reality device according to the homography matrix.

In an optional embodiment of the present disclosure, the determining the refraction parameter of the device screen of the extended reality device according to the first screen pixel coordinates and the second screen pixel coordinates comprises: determining normalized coordinates of the human-eye simulated camera corresponding to the device screen of the extended reality device according to the first screen pixel coordinates and the second screen pixel coordinates, modeling the normalized coordinates of the human-eye simulated camera to optimize distortion parameters, and determining the refraction parameters of the device screen of the extended reality device according to the optimized distortion parameters.

In an optional embodiment of the present disclosure, the determining the homography matrix according to the first screen pixel coordinates and the second screen pixel coordinates comprises: determining a first matrix according to the first screen pixel coordinates and the second screen pixel coordinates, performing singular value decomposition on row vectors of the first matrix to obtain a solution corresponding to a minimum singular value, and normalizing the solution corresponding to the minimum singular value to obtain the homography matrix.

In an optional embodiment of the present disclosure, the determining normalized coordinates of the human-eye simulated camera corresponding to the device screen of the extended reality device according to the first screen pixel coordinates and the second screen pixel coordinates comprises: determining the normalized coordinates of the human-eye simulated camera corresponding to the device screen of the extended reality device according to the first screen pixel coordinates, the second screen pixel coordinates, and tooling-based intrinsic parameters of the virtual camera corresponding to the device screen of the extended reality device.

In an optional embodiment of the present disclosure, the method further comprises: determining normalized coordinates corresponding to the coordinates of the corner points of the first image according to the coordinates of the corner points of the first image, the tooling-based intrinsic parameters of the virtual camera corresponding to the device screen of the extended reality device, and a physical focal length of the virtual camera; and determining the first corresponding relationship according to the coordinates of the corner points of the first image and the normalized coordinates corresponding to the coordinates of the corner points of the first image.

In an optional embodiment of the present disclosure, the collecting the coordinates of the corner points of the first image and the second image by the screen calibration device comprises: normalizing, according to intrinsic parameters of the human-eye simulated camera, the coordinates of the corner points of the first image obtained by using the human-eye simulated camera to photograph the calibration target through the device screen of the extended reality device; and normalizing the coordinates of the corner points of the second image obtained by using the human-eye simulated camera to directly photograph the calibration target.

In an optional embodiment of the present disclosure, the converting the coordinates of the corner points of the first image and the coordinates of the corner points of the second image into first screen pixel coordinates and second screen pixel coordinates of the device screen of the extended reality device according to a first corresponding relationship comprises: converting the coordinates of the corner points of the first image and the coordinates of the corner points of the second image into the first screen pixel coordinates and the second screen pixel coordinates according to the first corresponding relationship and tooling-based intrinsic parameters of a virtual camera corresponding to the device screen of the extended reality device.

The specific implementation of the above operations can be found in the previous embodiments, which will not be described in detail here.

A person of ordinary skill in the art will appreciate that all or part of the steps in the various methods of the above embodiments may be completed by instructions, or by controlling related hardware through instructions. The instructions may be stored in a non-transitory computer-readable storage medium and loaded and executed by a processor.

To this end, the present disclosure provides a non-transitory computer-readable storage medium, on which computer program is stored. The computer program can be loaded by a processor to implement operations to realize the screen calibration method of extended reality device provided in the embodiments of the present disclosure. The operations include: collecting coordinates of corner points of a first image and a second image photographed by the screen calibration device, wherein the first image is obtained by using a human-eye simulated camera to photograph a calibration target through a device screen of the extended reality device, and the second image is obtained by using the human-eye simulated camera to directly photograph the calibration target; converting the coordinates of the corner points of the first image and the coordinates of the corner points of the second image into first screen pixel coordinates and second screen pixel coordinates of the device screen of the extended reality device according to a first corresponding relationship, wherein the first corresponding relationship is a corresponding relationship between calibrated pixels of the device screen of the extended reality device and coordinates of an image obtained by using the human-eye simulated camera to photograph the calibration target; determining a refraction parameter of the device screen of the extended reality device according to the first screen pixel coordinates and the second screen pixel coordinates.

In an optional embodiment of the present disclosure, the determining the refraction parameter of the device screen of the extended reality device according to the first screen pixel coordinates and the second screen pixel coordinates comprises: determining a pixel offset of the device screen of the extended reality device according to differences between the first screen pixel coordinates and the second screen pixel coordinates, and determining a refraction parameter of the device screen of the extended reality device according to the pixel offset.

In an optional embodiment of the present disclosure, the determining the refraction parameter of the device screen of the extended reality device according to the first screen pixel coordinates and the second screen pixel coordinates comprises: determining a homography matrix according to the first screen pixel coordinates and the second screen pixel coordinates, and determining the refraction parameter of the device screen of the extended reality device according to the homography matrix.

In an optional embodiment of the present disclosure, the determining the refraction parameter of the device screen of the extended reality device according to the first screen pixel coordinates and the second screen pixel coordinates comprises: determining normalized coordinates of the human-eye simulated camera corresponding to the device screen of the extended reality device according to the first screen pixel coordinates and the second screen pixel coordinates, modeling the normalized coordinates of the human-eye simulated camera to optimize distortion parameters, and determining the refraction parameters of the device screen of the extended reality device according to the optimized distortion parameters.

In an optional embodiment of the present disclosure, the determining the homography matrix according to the first screen pixel coordinates and the second screen pixel coordinates comprises: determining a first matrix according to the first screen pixel coordinates and the second screen pixel coordinates, performing singular value decomposition on row vectors of the first matrix to obtain a solution corresponding to a minimum singular value, and normalizing the solution corresponding to the minimum singular value to obtain the homography matrix.

In an optional embodiment of the present disclosure, the determining normalized coordinates of the human-eye simulated camera corresponding to the device screen of the extended reality device according to the first screen pixel coordinates and the second screen pixel coordinates comprises: determining the normalized coordinates of the human-eye simulated camera corresponding to the device screen of the extended reality device according to the first screen pixel coordinates, the second screen pixel coordinates, and tooling-based intrinsic parameters of the virtual camera corresponding to the device screen of the extended reality device.

In an optional embodiment of the present disclosure, the method further comprises: determining normalized coordinates corresponding to the coordinates of the corner points of the first image according to the coordinates of the corner points of the first image, the tooling-based intrinsic parameters of the virtual camera corresponding to the device screen of the extended reality device, and a physical focal length of the virtual camera; and determining the first corresponding relationship according to the coordinates of the corner points of the first image and the normalized coordinates corresponding to the coordinates of the corner points of the first image.

In an optional embodiment of the present disclosure, the collecting the coordinates of the corner points of the first image and the second image by the screen calibration device comprises: normalizing, according to intrinsic parameters of the human-eye simulated camera, the coordinates of the corner points of the first image obtained by using the human-eye simulated camera to photograph the calibration target through the device screen of the extended reality device; and normalizing the coordinates of the corner points of the second image obtained by using the human-eye simulated camera to directly photograph the calibration target.

In an optional embodiment of the present disclosure, the converting the coordinates of the corner points of the first image and the coordinates of the corner points of the second image into first screen pixel coordinates and second screen pixel coordinates of the device screen of the extended reality device according to a first corresponding relationship comprises: converting the coordinates of the corner points of the first image and the coordinates of the corner points of the second image into the first screen pixel coordinates and the second screen pixel coordinates according to the first corresponding relationship and tooling-based intrinsic parameters of a virtual camera corresponding to the device screen of the extended reality device.

The specific implementation of the above operations can be found in the previous embodiments, which will not be described in detail here.

The computer-readable storage medium may include: a read-only memory (ROM), a random access memory (RAM), a disk or an optical disk, etc.

Since the instructions stored in the computer-readable storage medium can execute the steps in the screen calibration method of any extended reality device provided in the present disclosure, the beneficial effects that can be achieved by the screen calibration method of any extended reality device provided in the present disclosure can be achieved. Please refer to the previous embodiments for details and will not be repeated here.

The screen calibration method, device, electronic device and computer-readable storage medium of an extended reality device provided by the present disclosure are introduced in detail above. Specific examples are used herein to illustrate the principles and implementation methods of the present disclosure. The description of the above embodiments is only used to help understand the method of the present disclosure and its core idea. At the same time, for a person skilled in the art, according to the idea of the present disclosure, there will be changes in the specific implementation method and application scope. In summary, the content of this specification should not be understood as a limitation on the present disclosure.

In this specification, specific examples are applied to explain the principle and implementation of the present disclosure. The description of the above embodiments is only used to help understand the method and core idea of the present disclosure. Meanwhile, for those skilled in the art, there will be changes in the specific implementation mode and application scope according to the idea of the present disclosure. To sum up, the contents of this specification should not be construed as limiting the present disclosure.

What is claimed is:

1. A method for calibrating a screen of an extended reality device, performed by a screen calibration device applied to the extended reality device, and the method comprising:

normalizing by the screen calibration device, according to intrinsic parameters of a human-eye simulated camera, coordinates of corner points of a first image obtained by using the human-eye simulated camera to photograph a calibration target through a device screen of the extended reality device;

normalizing coordinates of corner points of a second image obtained by using the human-eye simulated camera to directly photograph the calibration target;

determining normalized coordinates corresponding to the coordinates of the corner points of the first image according to the coordinates of the corner points of the first image, tooling-based intrinsic parameters of a virtual camera corresponding to the device screen of the extended reality device, and a physical focal length of the virtual camera;

determining a first corresponding relationship according to the coordinates of the corner points of the first image and the normalized coordinates of the corner points of the first image;

converting, according to the first corresponding relationship and the tooling-based intrinsic parameters of the virtual camera corresponding to the device screen of the extended reality device, the coordinates of the corner points of the first image and the coordinates of the corner points of the second image into first screen pixel coordinates and second screen pixel coordinates; and determining a refraction parameter of the device screen of the extended reality device according to the first screen pixel coordinates and the second screen pixel coordinates, comprising:

determining a pixel offset of the device screen of the extended reality device according to differences between the first screen pixel coordinates and the second screen pixel coordinates; and determining a refraction parameter of the device screen of the extended reality device according to the pixel offset.

2. The method according to claim 1, wherein the determining the refraction parameter of the device screen of the extended reality device according to the first screen pixel coordinates and the second screen pixel coordinates further comprises:

determining a homography matrix according to the first screen pixel coordinates and the second screen pixel coordinates; and determining the refraction parameter of the device screen of the extended reality device according to the homography matrix.

3. The method according to claim 1, wherein the determining the refraction parameter of the device screen of the extended reality device according to the first screen pixel coordinates and the second screen pixel coordinates further comprises:

determining normalized coordinates of the human-eye simulated camera corresponding to the device screen of the extended reality device according to the first screen pixel coordinates and the second screen pixel coordinates;

modeling the normalized coordinates of the human-eye simulated camera to optimize distortion parameters; and determining the refraction parameters of the device screen of the extended reality device according to the optimized distortion parameters.

4. The method according to claim 2, wherein the determining the homography matrix according to the first screen pixel coordinates and the second screen pixel coordinates comprises:

determining a first matrix according to the first screen pixel coordinates and the second screen pixel coordinates;

performing singular value decomposition on row vectors of the first matrix to obtain a solution corresponding to a minimum singular value; and normalizing the solution corresponding to the minimum singular value to obtain the homography matrix.

5. The method according to claim 3, wherein the determining normalized coordinates of the human-eye simulated camera corresponding to the device screen of the extended reality device according to the first screen pixel coordinates and the second screen pixel coordinates comprises:

determining the normalized coordinates of the human-eye simulated camera corresponding to the device screen of the extended reality device according to the first screen pixel coordinates, the second screen pixel coordinates, and the tooling-based intrinsic parameters of the virtual camera corresponding to the device screen of the extended reality device.

6. An electronic device, comprising:

a processor; and a memory, storing computer program executable by the processor to perform operations comprising:

normalizing by a screen calibration device, according to intrinsic parameters of a human-eye simulated camera, coordinates of corner points of a first image obtained by using the human-eye simulated camera to photograph a calibration target through a device screen of an extended reality device;

normalizing coordinates of corner points of a second image obtained by using the human-eye simulated camera to directly photograph the calibration target;

determining normalized coordinates corresponding to the coordinates of the corner points of the first image according to the coordinates of the corner points of the first image, tooling-based intrinsic parameters of a virtual camera corresponding to the device screen of the extended reality device, and a physical focal length of the virtual camera;

determining a first corresponding relationship according to the coordinates of the corner points of the first image and the normalized coordinates of the corner points of the first image;

converting, according to the first corresponding relationship and the tooling-based intrinsic parameters of the virtual camera corresponding to the device screen of the extended reality device, the coordinates of the corner points of the first image and the coordinates of the corner points of the second image into first screen pixel coordinates and second screen pixel coordinates; and determining a refraction parameter of the device screen of the extended reality device according to the first screen pixel coordinates and the second screen pixel coordinates, comprising:

determining a pixel offset of the device screen of the extended reality device according to differences between the first screen pixel coordinates and the second screen pixel coordinates; and determining a refraction parameter of the device screen of the extended reality device according to the pixel offset.

7. The electronic device according to claim 6, wherein the determining the refraction parameter of the device screen of the extended reality device according to the first screen pixel coordinates and the second screen pixel coordinates further comprises:

determining a homography matrix according to the first screen pixel coordinates and the second screen pixel coordinates; and determining the refraction parameter of the device screen of the extended reality device according to the homography matrix.

8. The electronic device according to claim 6, wherein the determining the refraction parameter of the device screen of the extended reality device according to the first screen pixel coordinates and the second screen pixel coordinates further comprises:

determining normalized coordinates of the human-eye simulated camera corresponding to the device screen of the extended reality device according to the first screen pixel coordinates and the second screen pixel coordinates;

modeling the normalized coordinates of the human-eye simulated camera to optimize distortion parameters; and determining the refraction parameters of the device screen of the extended reality device according to the optimized distortion parameters.

9. The electronic device according to claim 7, wherein the determining the homography matrix according to the first screen pixel coordinates and the second screen pixel coordinates comprises:

determining a first matrix according to the first screen pixel coordinates and the second screen pixel coordinates;

performing singular value decomposition on row vectors of the first matrix to obtain a solution corresponding to a minimum singular value; and normalizing the solution corresponding to the minimum singular value to obtain the homography matrix.

10. The electronic device according to claim 8, wherein the determining normalized coordinates of the human-eye simulated camera corresponding to the device screen of the extended reality device according to the first screen pixel coordinates and the second screen pixel coordinates comprises:

determining the normalized coordinates of the human-eye simulated camera corresponding to the device screen of the extended reality device according to the first screen pixel coordinates, the second screen pixel coordinates, and the tooling-based intrinsic parameters of the virtual camera corresponding to the device screen of the extended reality device.

11. A non-transitory computer-readable storage medium, storing computer program executable by a processor to perform operations comprising:

normalizing by a screen calibration device, according to intrinsic parameters of a human-eye simulated camera, coordinates of corner points of a first image obtained by using the human-eye simulated camera to photograph a calibration target through a device screen of an extended reality device;

normalizing coordinates of corner points of a second image obtained by using the human-eye simulated camera to directly photograph the calibration target;

determining normalized coordinates of the coordinates of the corner points of the first image according to the coordinates of the corner points of the first image, tooling-based intrinsic parameters of a virtual camera corresponding to the device screen of the extended reality device, and a physical focal length of the virtual camera;

determining a first corresponding relationship according to the coordinates of the corner points of the first image and the normalized coordinates of the corner points of the first image;

converting, according to the first corresponding relationship and the tooling-based intrinsic parameters of the virtual camera corresponding to the device screen of the extended reality device, the coordinates of the corner points of the first image and the coordinates of the corner points of the second image into first screen pixel coordinates and second screen pixel coordinates; and determining a refraction parameter of the device screen of the extended reality device according to the first screen pixel coordinates and the second screen pixel coordinates, comprising:

determining a pixel offset of the device screen of the extended reality device according to differences between the first screen pixel coordinates and the second screen pixel coordinates; and determining a refraction parameter of the device screen of the extended reality device according to the pixel offset.

* * * * *